Figure 1:
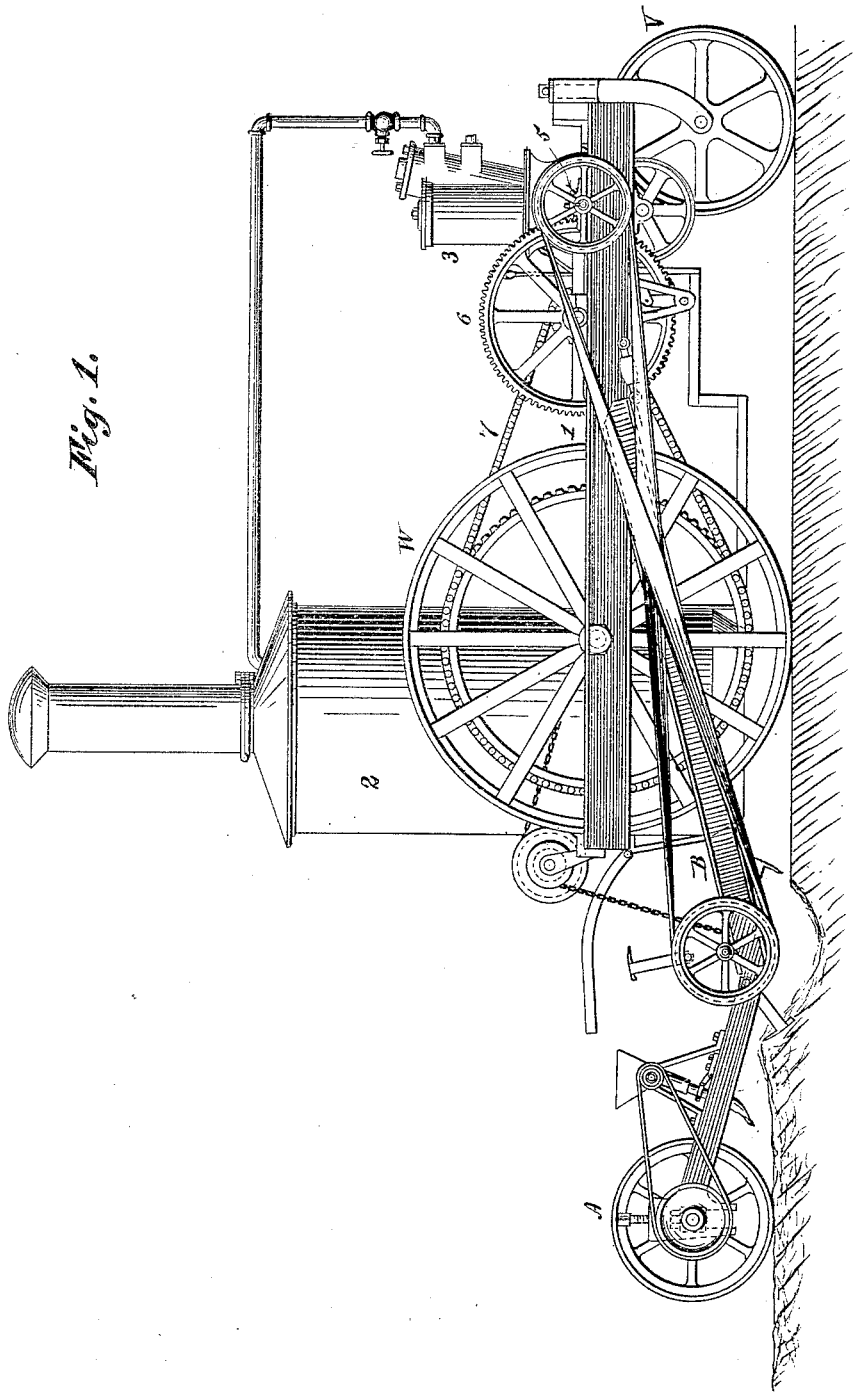

(No Model.)  7 Sheets—Sheet 1.

R. STONE.
ROTARY CULTIVATOR.

No. 437,872.   Patented Oct. 7, 1890.

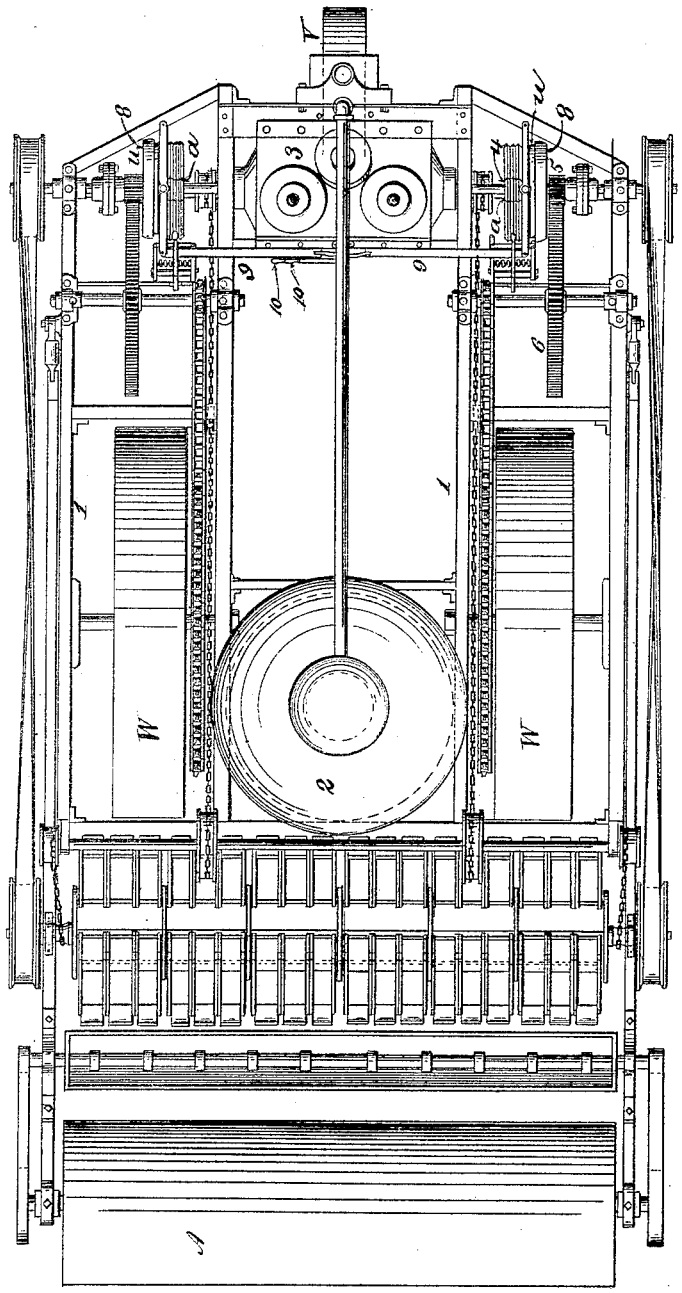

(No Model.) 7 Sheets—Sheet 3.
R. STONE.
ROTARY CULTIVATOR.
No. 437,872. Patented Oct. 7, 1890.
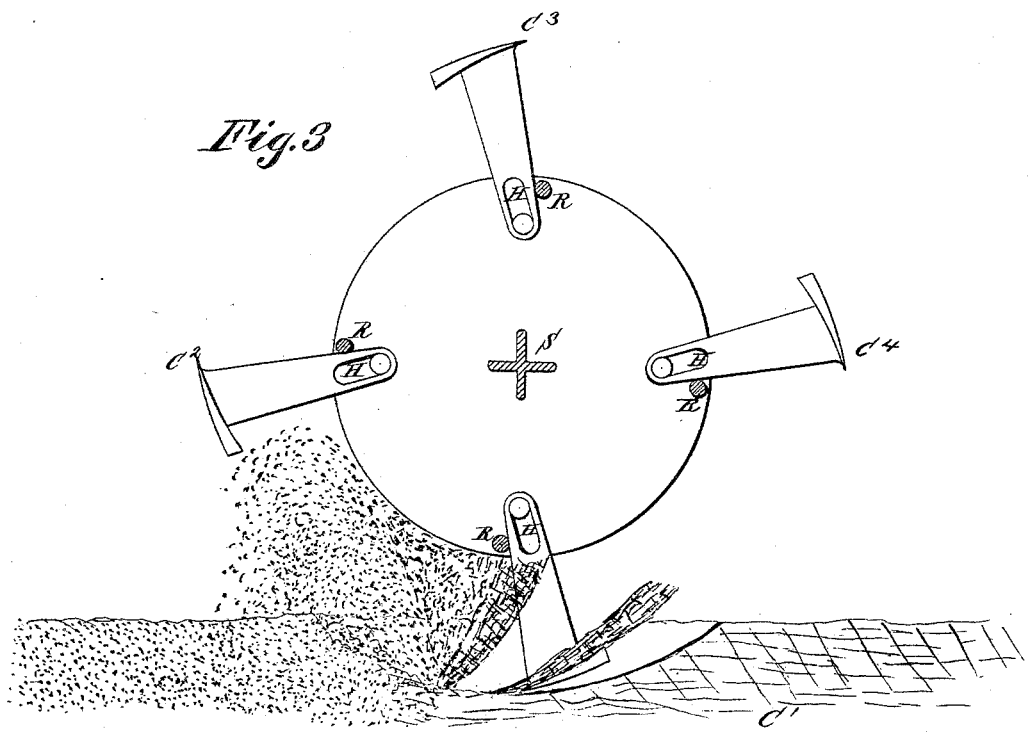
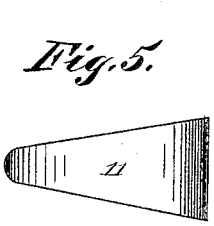
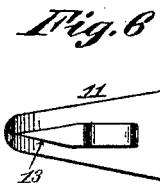

(No Model.) 7 Sheets—Sheet 4.
R. STONE.
ROTARY CULTIVATOR.
No. 437,872. Patented Oct. 7, 1890.
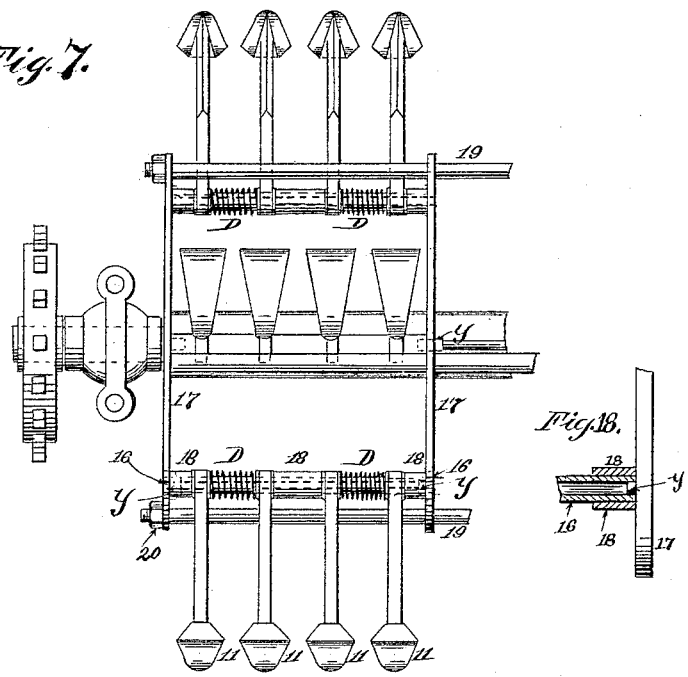
Fig. 7.
Fig. 18.
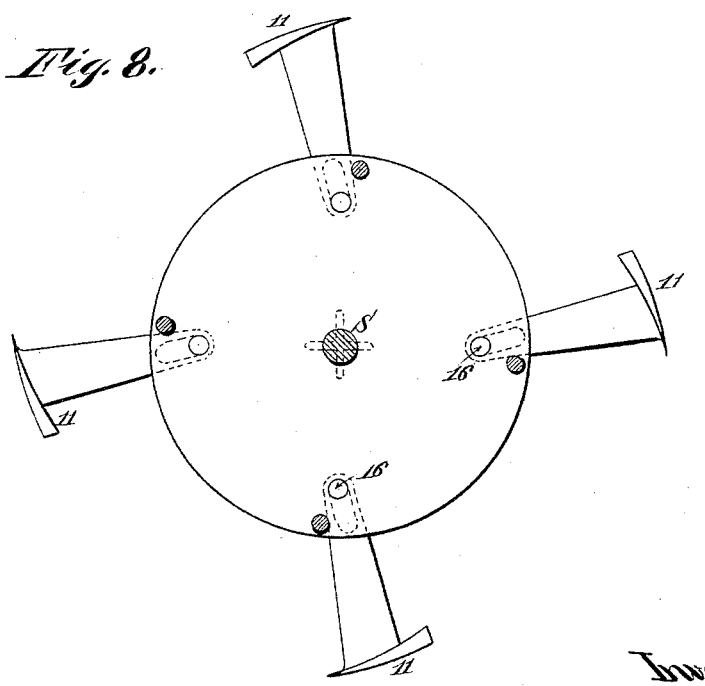
Fig. 8.
Witnesses:
D. W. Gardner
H. S. McArthur
Inventor:
Roy Stone
By Foster & Freeman
Attys (No Model.) 7 Sheets—Sheet 5.
R. STONE.
ROTARY CULTIVATOR.
No. 437,872. Patented Oct. 7, 1890.
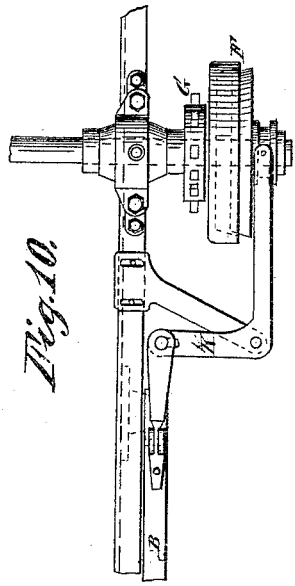
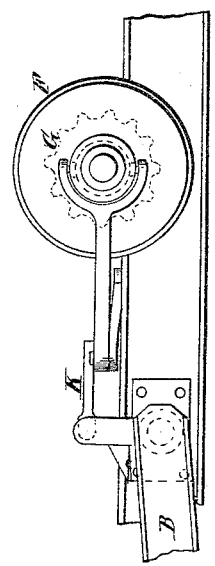
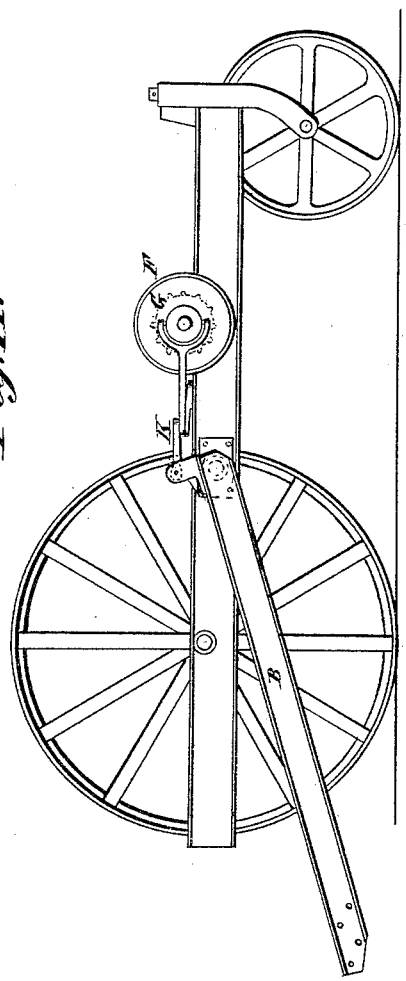

(No Model.) 7 Sheets—Sheet 6.
R. STONE.
ROTARY CULTIVATOR.

No. 437,872. Patented Oct. 7, 1890.

Witnesses:
Inventor:
Roy Stone (No Model.) 7 Sheets—Sheet 7.

R. STONE.
ROTARY CULTIVATOR.

No. 437,872. Patented Oct. 7, 1890.

Witnesses:
D. W. Gardner
H. D. McArthur

Roy Stone Inventor:
Foster & Freeman
Attys

UNITED STATES PATENT OFFICE.

ROY STONE, OF NEW YORK, N. Y.

ROTARY CULTIVATOR.

SPECIFICATION forming part of Letters Patent No. 437,872, dated October 7, 1890.

Application filed January 29, 1889. Renewed March 10, 1890. Serial No. 343,275. (No model.)

*To all whom it may concern:*

Be it known that I, ROY STONE, of the city, county, and State of New York, have invented an Improvement in Rotary Cultivators, of which the following is a full, true, and exact description, reference being had to the accompanying drawings.

Revolving plows or harrows, to avoid injury from solid obstacles, require their teeth or cutters pivoted instead of fixed, and being thereby made dependent upon centrifugal force for their action a high speed of revolution is indispensable. Under this condition if each digger throws its portion of earth backward with the full speed of its own travel it not only puts that portion beyond the reach of the following diggers, but employs a power in giving it useless velocity equivalent to raising it high enough to acquire the same velocity in falling.

The chief object of my invention is to give a better tillage with less expenditure of force by cutting the earth in such a manner as to lift and throw it gently into the range of the following diggers for a second or third effect. This is done by means of peripheral knives, which pass through the earth and leave it behind them in their revolution, but raise it toward the center of their supporting-drum, where it is beaten and pulverized by the succeeding knives or by other appendages or fixtures of the same drum. These knives are so hung as to be thrown out by centrifugal force, but are prevented from reaching a radial position in order to give them a certain rigidity sufficient for their normal work while yielding to any greater obstacle. Without this provision they would be retarded in each revolution by their work of cutting and, changing their plane, become in a measure scrapers instead of cutters, and would be liable to wear rapidly on their suspension-joints. The cutters are suspended from the carrying-drum by means of slots in their hangers, which enable them to slide inward or swerve to either side to avoid obstacles.

The drum is composed of a star-iron shaft or center with heads and intermediate plates and through-rods, which latter serve as stops and holdbacks for the cutters. The heads and intermediate plates have bosses or sockets to receive the sections of rod or pipe on which the cutters are strung, so that by slackening the through-rods any section of the cutters may be removed at pleasure. Coil-springs around the suspending-rods between the cutters keep them normally radial, but yield when obstacles are met.

The seeding attachment is believed to be novel in having its delivery-spouts telescopic and movable forward and backward for regulating the depth of covering the seed and in supporting the digging-drum and gaging the depth of cut by means of the roller.

The machine is mounted on three wheels, of which two are independent drivers actuated by friction-clutches, and the third a caster-wheel pivoted vertically forward of its center, so that it yields to any impulse given by the drivers, and no force is required for steering except to work the clutch-levers, which are so arranged that both can be worked together or separately with one hand. The machine turns on either wheel as a pivot or makes any required curve.

The cutters may have either single or double hangers for the blades, but the hangers in either case are knife-edged in front. The blades may be warped so as to turn the earth in cutting it.

The drum may be driven either by belts or by chains and sprockets; but in either case it is arranged so that the lowering of the drum starts its revolution and raising stops it.

The hoisting mechanism is peculiarly arranged, so that the drum may be raised or lowered by moving the one lever, or held at any point by releasing the same.

Figure 12:
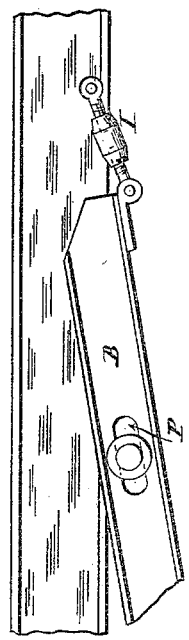
Figure 13:
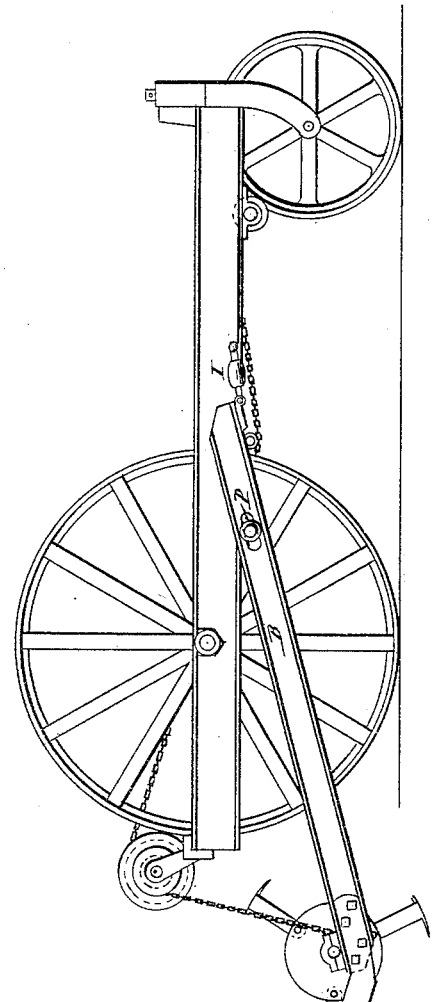
Figures 14, 15:
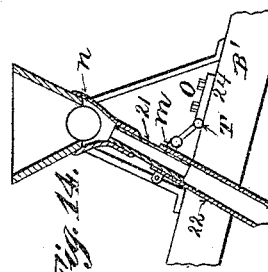
Figure 16:
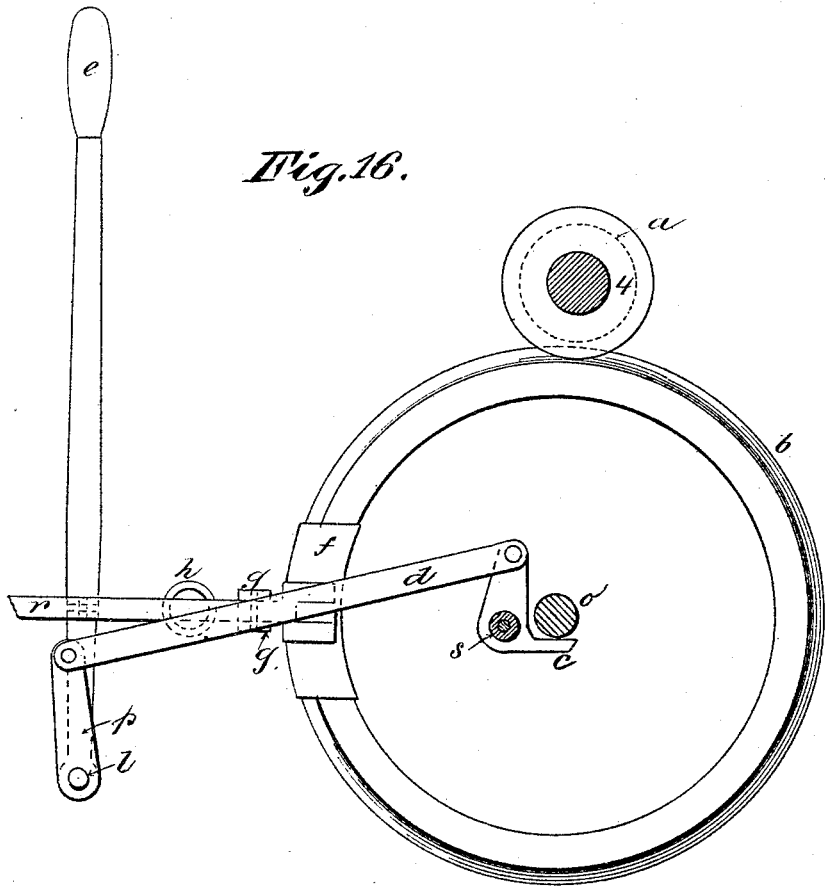
Figure 17:
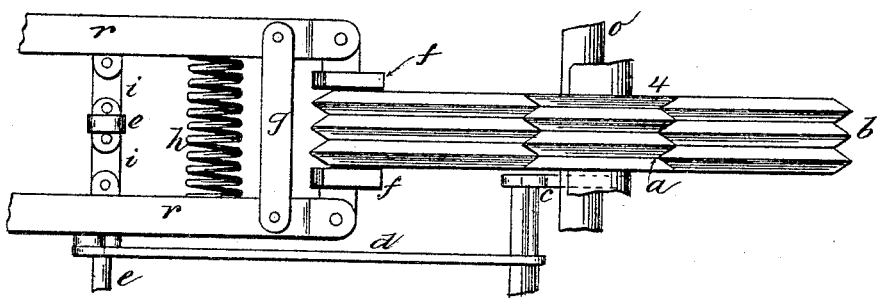

In the drawings, Figure 1 is a general side view of the apparatus, including seeder and roller. Fig. 2 is a general plan of same. Fig. 3 shows the construction of drum-heads and action of diggers in the earth. Figs. 4, 5, and 6 show details of single cutters, Fig. 4 being a side view, Fig. 5 a bottom view, and Fig. 6 a top view. Figs. 7 and 8 show construction of drum with springs, &c. Figs. 9, 10, and 11 show devices for automatically starting and stopping the drum as it is raised and lowered when driven by chains. Fig. 12 shows device for same with belt. Fig. 13 shows method of gaging depth of cut by adjustment on the bearings of the following roller. Figs. 14 and 15 show method of adjusting the seeder-spouts for a varying depth of covering. Figs. 16 and 17 show plan of raising, holding, and lowering the drum by one lever; Fig. 18, detail of drum-head and boss.

The apparatus consists, generally, of a frame 1, upon which the various parts are supported. This frame carries a source of power—say a boiler and steam-engine—by which the entire wheeled vehicle is moved, and by which, likewise, the rotating cutters are caused to operate. The frame itself and the parts supported by it are carried upon two driving-wheels W W and the free caster-wheel V. From the boiler 2 the engine 3 is operated, driving the shaft 4, from which the power to drive the different parts of the apparatus is derived. This shaft 4 drives the pinion-wheel 5, the gear-wheel 6, and the driving-wheels W by sprocket and chain 7. The pinion 5 is driven from the shaft 4 by any suitable friction device 8, controlled by arms 9 and levers 10 in any well-known way, so that either wheel W can be driven at will, or both together, as determined by the operator. The shaft 4 additionally drives the friction-wheel $a$, which drives the friction-wheels $b$, when the same are brought into gear or contact, as shown in Figs. 16 and 17. These wheels serve to raise and lower the cutting-drum when thrown into contact. They are operated by the lever $e$, as hereinafter described.

The method of tillage is shown in Fig. 3, where the cutter at the bottom $C'$ is leaving its own slice of earth behind it while it overtakes the one cut by its predecessor $C^2$, which in turn has overtaken and reduced to fragments the slice next in advance. Any required number of beaters may be hung between the cutters to aid in the reduction. The same figure shows the cutters held back by stop-rods R from reaching a radial position; also the star iron-shaft S and slotted hangers H.

By means of the slots and the coil-springs D, Fig. 14, the cutters are allowed to swerve in passing obstacles and returned to their normal position.

The cutter itself has the flat plate 11, and the hanger 12 is sharpened, as at 13, so as to pass through the earth. Its upper end is slotted, as at 14, which slots pass over the supporting-rods 16, which rods are, in fact, pipe supported upon bosses at $y$, attached to the side plates 17, and which enter within the pipe. In order to keep the cutters in their proper position, upon the inner pipe 16 are short sections of pipe 18, which serve to keep the cutters the proper distance apart and from the frames 17. Springs D between certain of the cutters likewise serve to maintain them in their proper position. The plates 16 are held together by rods 19, and when the nuts 20 are withdrawn the plates 17 can be sufficiently slacked apart to allow of the withdrawal of one section of pipe 16 by slipping it over the end of the retaining-boss.

The automatic starting and stopping of drum when driven by chain is accomplished by means of the connection of the side bar B, Figs. 9, 10, and 11, through the bell-crank K, with the friction-clutch F, so that the lowering of the drum carried by the side bars starts the sprocket-wheel G, and by means of the chain its corresponding sprocket on the drum-shaft, while raising the drum has the contrary effect. The same result is accomplished when an ordinary belt is used by having the side bar B, Figs. 12 and 13, slotted at its point of attachment P, so that it may be shoved outward by the radius-bar I as it is lowered, and retracted as it is raised, thus tightening and loosening the belt, so that it may work or slip as required. This is a modification of the last arrangement.

When the seeding attachment is used, as shown in Fig. 1, the roller A carries the weight of the digging-drum, and by an adjustment on its bearings (shown in detail at E, Fig. 13) the depth of the cut is gaged.

In the seeding arrangement, the seed being dropped in the midst of a shower of earth behind the driver, the depth to which it is covered will be varied as the seeder-spouts are raised or lowered, or shifted fore and aft. The spouts are therefore made telescopic and movable forward and backward, as shown in Figs. 14 and 15, where a telescopic joint is shown at $m$, a flexible connection of leather or rubber at $n$, and means of fixing the lateral position of the spout at O, when the rod Q, which connects by links T with all the spouts, is adjustable by the slotted attachment to the extended side bar B', which carries the seeder. The seed then passes from the hopper through the telescopic sections 21 and 22 to the ground.

$m$ represents a screw-clutch, by which the height of the lower section 22 can be adjusted. It can be also laterally adjusted by moving the arm 23 upon the rod Q and setting it where desired. The slotted plate 24, to which the link T is attached can also be adjusted backward and forward, so as to adjust that position of the seeders.

The friction-gear for raising, holding, and lowering the digging attachment by one lever is shown in Figs. 16 and 17, where $b$ is a friction-wheel fixed on shaft $o$ of the drum on which wind the supporting-chains of the digging apparatus. This wheel engages with the driving-pulley $a$ when it is lifted into contact by the bell-crank $c$, pivoted at $s$, and operated through the link $d$ by the lever $e$, pivoted at $l$, the lever $e$ and the radius-bar $p$ being rigid on the shaft $l$, and the latter pivoted to the link $d$. At the same time that the driver $a$ is thus set in motion by the lever moving to the left the grip-brake is disengaged by the action of the links $i$ $i$, drawing together the side bars $r$ $r$, which are held apart by the cross-bars g g, and consequently open beyond the cross-bar and draw back the brake-shoes f f. When the lever is released, the spring h restores the grip of the brake and replaces the lever. When the lever is moved in the opposite direction, the brake is disengaged, but the friction is not engaged and the chain unwinds freely.

The apparatus returns normally to the position shown in Fig. 17, in which the spring h sets the brake, and the lever e assumes a central position. It will be understood that the lever e operates both the shaft l and also draws back the toggle-joint links i i.

The method of mounting and steering the apparatus is shown in Figs. 1 and 2. The two driving-wheels W W are independent of each other and are actuated by separate friction-clutches 8 8 on the engine-shaft through the pinions-gears, &c., shown.

The third wheel is a caster-wheel pivoted vertically forward of the center and yielding freely to any impulse given by the drivers. To steer the machine, therefore, it is only required to throw the clutches out or in, and it turns on either driving-wheel as a pivot.

What I claim as my invention, and desire to secure by Letters Patent, is—

1. A cultivator consisting of a forward revolving drum or carrier with independent suspended knives having substantially peripheral blades, the whole adapted to undercut the earth, lift it inward, and pulverize it by the striking of succeeding knives or other appendages or fixtures of the drum or carrier, substantially as described.

2. In a cultivator, the revolving drum or carrier having hinged cutters, and a stop engaging with said cutters and preventing their assuming a radial position, substantially as described.

3. In a cultivator, the combination, with a revolving drum, of hinged or suspended cutters having each a peripheral blade and a knife-edged hanger, whereby the earth is cut both longitudinally and transversely by the same implements, substantially as described.

4. In a cultivator, the combination, with the cutter-carrying rods or pipes, of the springs D, the cutters 11, the said springs acting upon both cutters, and the slots H in the cutter-hangers, whereby the cutters are allowed to swerve sidewise or slide inward to pass obstacles, substantially as described.

5. In a cultivator, the combination of the revolving drum and hinged cutters with the lifting-drum having a movable friction-wheel, the spring-brake, and the actuating-lever operating both the brake and friction-wheel and depending on its position, whereby the cutter-drum is raised or lowered by moving the one lever, or held at any point where the lever is released, substantially as described.

6. In a cultivator, the combination of a revolving drum and chain for driving the same, with a loose chain-wheel on the driving-shaft, a friction-clutch for the wheel, and a suitable connection with the drum-carrier for operating the clutch, whereby when the drum is lowered to its work its revolution is automatically started, and correspondingly stopped when it is raised, substantially as described.

7. In a cultivator, the combination with centrifugal cutters adapted to lift a portion of earth into the air, of a seeder having its delivery also in the air and in the midst of the earth so lifted, and mechanism for varying its point of delivery to regulate the depth of covering, substantially as described.

8. In a cultivator, the combination, with a revolving drum carrying centrifugal cutters, and pivoted frame supporting the drum, of a roller carrying the rear end of the pivoted frame, and mechanism for gaging the depth of tillage by adjustment of the roller-bearings, substantially as described.

9. In a cultivator, the combination of the hinged frame carrying the working implements thereof with the main frame carrying the source of power, the independent driving-wheels, the friction-clutches and means of operating the same, and the free caster-wheel vertically pivoted forward of its axis, whereby the machine is guided wholly through its propelling mechanism and without steering-gear, substantially as described.

In witness whereof I have signed my name to this specification in the presence of two subscribing witnesses.

ROY STONE.

Witnesses:
H. CONTANT,
WM. A. POLLOCK.